Dec. 18, 1928.  
H. C. GEORGIUS  
1,695,710  
RUNNER ATTACHMENT FOR FARM IMPLEMENTS  
Filed June 3, 1927
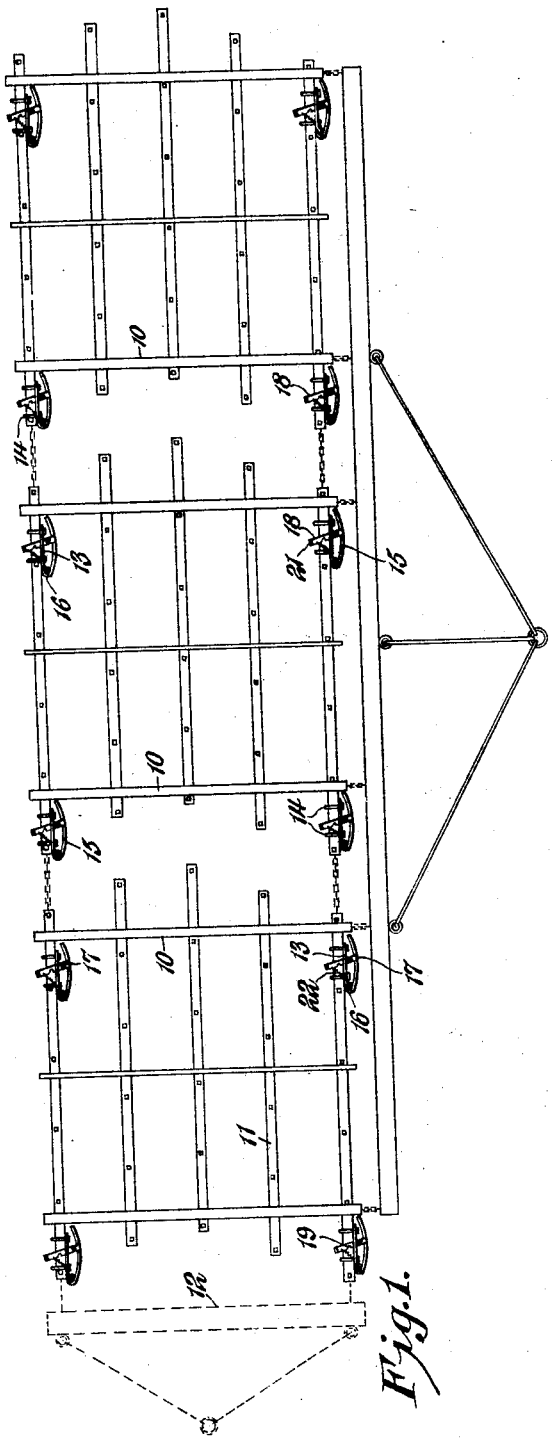
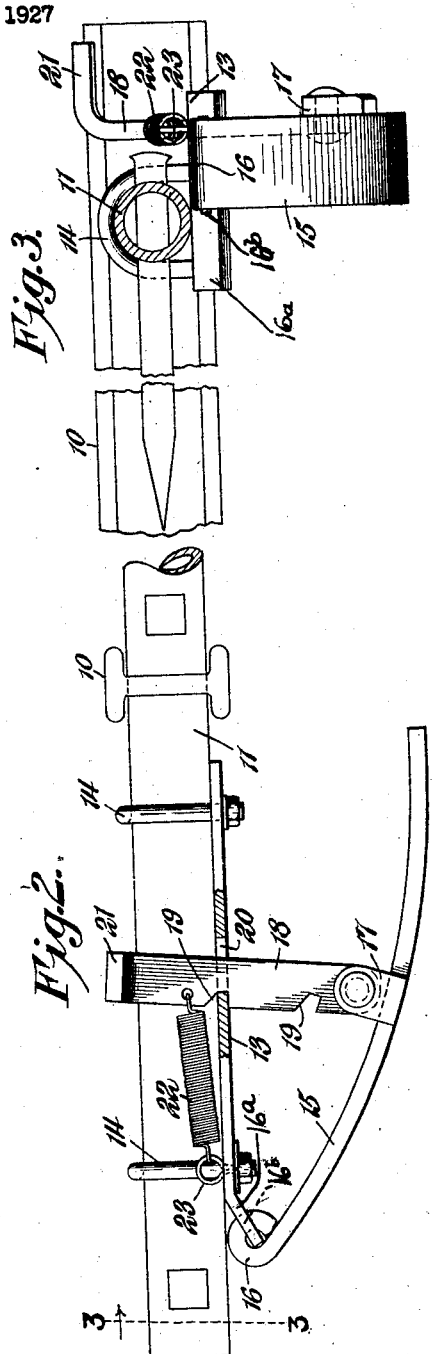
INVENTOR  
*Henry Georgius,*  
BY  
*Philip E. Siggers*  
ATTORNEY Patented Dec. 18, 1928.

1,695,710

UNITED STATES PATENT OFFICE.

HENRY C. GEORGIUS, OF MANNING, IOWA.

RUNNER ATTACHMENT FOR FARM IMPLEMENTS.

Application filed June 3, 1927. Serial No. 196,358.

This invention relates to runners or skids for farm implements and aims, among other objects, to provide an improved attachment for harrows and the like adapted to be used in transporting them to and from the place of use.

In the drawings:

Fig. 1 is a top plan view of a sectional harrow having improved runners embodying the invention applied thereto;

Fig. 2 is a fragmentary side elevation showing one of the runners in operative position; and Fig. 3 is a sectional view taken on the line 3—3 of Fig. 2.

Referring specifically to the drawing and to the embodiment of my invention selected for illustration, I have there shown my runners applied to a harrow composed of a series of drag sections 10 which are of conventional design, each section having toothed bars 11 adapted to be turned into operative or inoperative positions by means of the ordinary hand lever mechanism usually provided on such implements.

Herein, I have shown a series of runners adapted to be attached or secured to the toothed bars 11 adjacent to the four corners of each section of the harrow and so arranged that the harrow may be drawn sidewise as indicated by the dotted draw-bar 12 in Fig. 1. To the end that each of the runners may be made as a complete unit and applied to various types of sectional harrows, there is shown a bracket or securing plate or elongated supporting plate 13 adapted to be secured to a toothed bar by suitable attaching means such as the U-bolts 14, assuming that the toothed bars are made of steel tubes.

Referring to Fig. 2, the forward end of the bracket or securing plate is shown as bent downwardly to provide a hinged portion to which is pivotally connected a curved runner 15 which conveniently may be made of scrap iron and preferably is bent at its forward end to provide an eye portion 16 cooperating with transverse slot 16ᵇ in the bent portion 16ᵃ of the bracket. Each of the runners is secured to swing or be hinged in a plane at right angles to the plane of the teeth in the tooth bar. This arrangement is such that when the teeth are in their side positions, the skids may be projected to slide over the ground and support the sections. Also, when the teeth are turned to their active or cultivating positions, the runners are swung to their inactive positions where they do not interfere with the ordinary functioning of the harrow.

To the end that the runners may be projected to support the harrow sections at a sufficient height from the ground to clear ordinary obstructions such as may be encountered in a road or path to the field, each runner is shown as having an integral ear 17 to which a latch bar or locking lever 18 is pivotally connected. Herein, the bar has two notches 19, one to latch the runner in its inactive position and the other to latch it in its active position (see Fig. 2) by engaging the lower side of the bracket or plate 13. I have shown the bar 18 as extending through the longitudinal slot or opening 20 in the plate or bracket 13 at one side of the tooth bar 11 and the upper end or extension of the bar 18 presents a handle portion 21 to permit it to be disengaged from the plate by moving it backwardly in the slot 20.

To prevent accidental disengagement of the slot bar from the plate 13, I have shown a tension spring 22 connected to the bar and to a suitable clip or eye 23 at the forward end of the bracket or plate.

From the foregoing description it will be seen that I have provided simple composite runners which may be manufactured very cheaply and which may be applied to any ordinary type of harrow or like farm implement whether it has steel tooth bars or even wooden beams. Moreover, my improved runners facilitate the dragging of a series of connected harrow sections through narrow gate openings and the like while the main draw bar or gang beam is connected. It is only necessary to attach a short draw bar such as the draw bar 12 shown in dotted lines in Fig. 1 to one side of the harrow and the main draw bar may be through back over the sections while they are being dragged to or from the field.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. A harrow attachment comprising, in combination, a supporting bracket adapted to be secured to a tooth-bar; a runner pivotally mounted on said supporting member and arranged to open in a plane substantially at right angles to the plane of the harrow teeth; a notched latch bar pivoted to the runner and extending through an opening provided in said bracket; the extension presenting a handle to release the notched portions from engagement with the bracket; and a spring connected to the bar normally to hold it in latched engagement.

2. A harrow attachment comprising, in combination, a supporting plate; U-bolts extending through the supporting plate to secure it to a tooth-bar; a runner pivotally mounted on the supporting plate; a notched latch bar pivoted to the runner and extending through an opening in said supporting plate, the extension providing an operating handle; and a spring connected to said bar normally to hold it in latched engagement with the plate.

3. A harrow attachment comprising, in combination, an elongated supporting plate having a downward bent portion at its forward end, said bent portion having a transverse slot therein; means to rigidly secure the plate to a tooth bar; a curved runner having an eye portion at its forward end cooperating with the slot in said bent portion of the plate to provide a hinge connection; said plate having a longitudinal slot therein, said runner having an upstanding integral ear; a locking lever pivoted to the ear and extending through the slot in the plate; means to lock the lever to the plate; and a spring connected to the extended portion of the lever and to the plate to hold the lever in locked position.

In testimony, that I claim the foregoing as my own, I have hereto affixed my signature.

HENRY C. GEORGIUS.